United States Patent
Brown

(10) Patent No.: US 12,275,815 B2
(45) Date of Patent: Apr. 15, 2025

(54) PEST-RESISTANT SPRAY FOAM FORMULATIONS

(71) Applicant: Natural Polymers, LLC, Cortland, IL (US)

(72) Inventor: Benjamin Brown, Saint Charles, IL (US)

(73) Assignee: Natural Polymers, LLC, Cortland, IL (US)

(*) Notice: Subject to any disclaimer, the term of this patent is extended or adjusted under 35 U.S.C. 154(b) by 107 days.

(21) Appl. No.: 17/684,413

(22) Filed: Mar. 2, 2022

(65) Prior Publication Data

US 2022/0282027 A1 Sep. 8, 2022

Related U.S. Application Data

(60) Provisional application No. 63/155,931, filed on Mar. 3, 2021.

(51) Int. Cl.

| | | |
|---|---|---|
| *C08G 18/16* | (2006.01) | |
| *C08G 18/18* | (2006.01) | |
| *C08G 18/28* | (2006.01) | |
| *C08G 18/30* | (2006.01) | |
| *C08G 18/42* | (2006.01) | |
| *C08G 18/76* | (2006.01) | |
| *C08J 9/00* | (2006.01) | |
| *C08K 5/00* | (2006.01) | |
| *C08K 5/20* | (2006.01) | |
| *C08K 11/00* | (2006.01) | |
| *C08G 101/00* | (2006.01) | |

(52) U.S. Cl.
CPC ....... *C08G 18/7671* (2013.01); *C08G 18/302* (2013.01); *C08J 9/0004* (2013.01); *C08J 9/0047* (2013.01); *C08K 5/0058* (2013.01); *C08K 11/00* (2013.01); *C08G 2101/00* (2013.01); *C08G 2110/0025* (2021.01); *C08J 2205/052* (2013.01); *C08J 2205/10* (2013.01); *C08J 2375/08* (2013.01)

(58) Field of Classification Search
None
See application file for complete search history.

(56) References Cited

U.S. PATENT DOCUMENTS

| | | |
|---|---|---|
| 5,086,081 A | 2/1992 | Savoca et al. |
| 5,177,046 A | 1/1993 | Savoca et al. |
| 5,212,306 A | 5/1993 | Savoca et al. |
| 5,236,964 A | 8/1993 | Savoca et al. |
| 5,248,646 A | 9/1993 | Savoca et al. |
| 2006/0100295 A1* | 5/2006 | Heraldo ............... C08G 18/664 521/172 |
| 2012/0172476 A1* | 7/2012 | Costa ................. C08G 18/4018 570/135 |
| 2014/0275303 A1* | 9/2014 | Yeates ....................... C08J 9/12 521/99 |

FOREIGN PATENT DOCUMENTS

JP 07223907 A * 8/1995

OTHER PUBLICATIONS

Machine translation of JP-07223907-A obtained from the European Patent Office in Aug. 2023 (Year: 2023).*

* cited by examiner

*Primary Examiner* — Melissa A Rioja
(74) *Attorney, Agent, or Firm* — Calfee, Halter & Griswold LLP

(57) ABSTRACT

Pest-resistant polyurethane spray foam formulations and products, including building insulation, are described. The "B" side of the formulation comprises water; a polyol composition comprising one or more polyols selected from glycerin-sucrose polyols, Mannich polyols, and aromatic polyester polyols, catalyst(s); surfactant(s); a blowing agent; and 0.5 to 5 wt. %, based on the amount of spray foam formulation, of a composition comprising a capsaicin compound. Capsaicin compounds can be successfully incorporated into spray foam formulations that process well to give high-quality foams. The foams inhibit termite infestation and can help to minimize or avoid structural damage that might otherwise go undetected.

14 Claims, No Drawings

PEST-RESISTANT SPRAY FOAM FORMULATIONS

FIELD OF THE INVENTION

The invention relates to pest-resistant spray foam formulations, and in particular, to polyurethane spray foams that incorporate a capsaicin compound.

BACKGROUND OF THE INVENTION

Polyurethane spray foam (or "spray foam") is commonly used to insulate homes and other buildings. The reactive mixture is sprayed in place, and a continuous cellular barrier forms that insulates flat and uneven surfaces and keeps air and moisture from penetrating cracks, seams, and joints. At construction sites, professional equipment is used to meter "A side" and "B side" components to generate the foaming mixture where and when it is needed. Commercial products aimed at consumers typically pre-package the reactive components separately in a single container for use in do-it-yourself jobs such as crack filling or sealing around windows and doors.

Insects (e.g., beetles, ants, termites), rodents, and other pests chew through wood and other building materials, annually causing millions of dollars in property damage. Spray foam insulation, although not a food source for pests, tends to hide damage to wood and other structural materials. Moreover, pests will tear or chew through untreated spray foam to access a warm building or a food source.

Boric acid is a well-known, readily available chemical used to deter numerous pests, including cockroaches. Because boric acid neutralizes or interferes with catalysts commonly used to produce polyurethane foams, it is normally present in such formulations only in a complexed form, e.g., as an amine-borate complex. A reported advantage of such amine-borate complexes is their low odor when compared with traditional amine catalysts (see, e.g., U.S. Pat. Nos. 5,086,081 and 5,236,964).

Capsaicin compounds or "capsaicinoids," which include capsaicin (8-methyl-N-vanillyl-6-nonenamide), occur naturally in chili peppers and are irritants for humans and other mammals. Consequently, capsaicin is a principal active ingredient in pepper sprays. Capsaicin compounds have apparently not been used in spray foam insulation products, and their ability to deter termites, beetles, mice, or other pests from damaging foam insulation or underlying structures has not been studied. The construction and DIY industries would benefit from the availability of spray foam products that effectively deter pests from entering and damaging or destroying homes and other buildings.

SUMMARY OF THE INVENTION

In one aspect, the invention relates to a pest-resistant polyurethane spray foam formulation. The spray foam formulation comprises an "A" side comprising one or more polyisocyanates; and a "B" side comprising other foam components. The "B" side comprises water; a polyol composition comprising one or more polyols selected from glycerin-sucrose polyols, Mannich polyols, and aromatic polyester polyols; one or more amine blowing catalysts; one or more urethane catalysts; one or more foam-stabilizing surfactants; and 0.5 to 5 wt. %, based on the amount of spray foam formulation, of a composition comprising a capsaicin compound.

In other aspects, the "B" side of the spray foam formulation further comprises an amine-borate complex.

The invention includes polyurethane spray foams produced using the formulations described above, including closed-cell building insulation produced using the formulations.

In other aspects, the invention relates to a catalyst composition comprising an amine-borate complex; and (b) a composition comprising a capsaicin compound.

I found that capsaicin compounds can be successfully incorporated into polyurethane spray foam formulations. In contrast to other additives (e.g., free boric acid) that offer limited pest resistance at the cost of sluggish processing and poor-quality foams, capsaicin compounds can be included in spray foam formulations that process well to give high-quality, pest-resistant foams. Spray foam insulation provides a continuous barrier but hides wooden structures and conceals any underlying termite damage. Consequently, a spray foam that can inhibit termite infestation can help to minimize or avoid structural damage that might otherwise go undetected.

DETAILED DESCRIPTION OF THE INVENTION

Pest-resistant polyurethane spray foam formulations comprise an "A" side comprising one or more polyisocyanates and a "B" side comprising other foam components.

The "A" Side: Polyisocyanates

Polyisocyanates suitable for use are well known, and many are commercially available from Dow Chemical (under the PAPI™, ISONATE®, and VORONATE™ marks), Evonik (VESTANAT®), BASF (LUPRANATE®), Covestro (MONDUR® and DESMODUR®), Huntsman (RUBINATE®), and other suppliers of polyurethane intermediates. Polyisocyanates suitable for use have average NCO functionalities within the range of 2.0 to 3.0. The polyisocyanate can be aromatic or aliphatic. Aromatic polyisocyanates include, e.g., toluene diisocyanates (TDI), 4,4'-diphenylmethane diisocyanates (MDI), or polymeric diisocyanates (p-MDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Aromatic polyisocyanates, especially polymeric MDIs having NCO functionalities within the range of 2.3 to 3.0, are preferred. Suitable polymeric MDIs include, for instance, LUPRANATE® M-10 (average NCO functionality=2.3) and LUPRANATE® M-20 (average NCO functionality=2.7), products of BASF as well as MONDUR® 489 (modified polymeric MDI, average NCO functionality=2.9, product of Covestro). Mixtures of different polyisocyanates can be used. Dimerized and trimerized polyisocyanates can be used. In some aspects, aromatic polyisocyanates, e.g., p-MDI, are preferred.

Generally, the polyisocyanate is used in an amount effective to achieve a targeted NCO/OH index, typically from 0.9 to 1.3, or from 1.0 to 1.2, or from 1.05 to 1.15.

The "B" Side Components

1. Water

The polyurethane spray foam formulations include water as a reactant. The amount of water used depends on several factors, including the amount of polyisocyanate, the desired NCO/OH index, the nature and amount of the polyol composition, which catalysts, foam-stabilizing surfactants, and blowing agents are used, and other factors. Generally, the water is used in an amount within the range of 0.5 to 5 wt. %, 1 to 4 wt. %, or 2 to 3 wt. % based on the amount of spray foam formulation.

2. Polyol Composition

The "B" side includes a polyol composition comprising one or more polyols selected from glycerin-sucrose polyols, Mannich polyols, and aromatic polyester polyols. In some aspects, at least two of these polyol classes are present. In a preferred aspect, at least one polyol from each of the three classes is included. The amount of polyol composition used varies but is typically within the range of 40 to 90 wt. %, or 50 to 85 wt. %, or 65 to 80 wt. % based on the amount of spray foam formulation.

In some aspects, the polyol composition comprises a glycerin-sucrose polyol having a hydroxyl number from 325 to 375 mg KOH/g, a Mannich polyol having a hydroxyl number from 400 to 450 mg KOH/g, and an aromatic polyester polyol having a hydroxyl number from 250 to 350 mg KOH/g.

a. Glycerin-Sucrose Polyol

In some aspects, the polyol composition comprises one or more glycerin-sucrose polyols. These polyols are commonly made by reacting an initiator mixture of desired average hydroxyl functionality with one or more epoxides (e.g., ethylene oxide, propylene oxide, or their combinations) in the presence of a basic or metal complex catalyst. In some cases, an alkoxylated initiator (e.g., a propoxylated glycerin or a propoxylated sucrose) is used. The targeted average hydroxyl functionality is typically within the range of 3.5 to 5, or from 4 to 5, or from 4.2 to 4.8.

Desirable glycerin-sucrose polyols will have hydroxyl numbers within the range of 300 to 550 mg KOH/g or from 325 to 450 mg KOH/g or from 325 to 375 mg KOH/g.

Suitable glycerin-sucrose polyols are commercially available from Carpenter (e.g. CARPOL® GSP-355, CARPOL® GSP-520), Dow (e.g., VORANOL™ 370, VORANOL™ 490), BASF (PLURACOL® SG-360), and other suppliers.

b. Mannich Polyol

Mannich polyols are typically reaction products of a phenol (especially alkylated phenols), formaldehyde, and an alkanolamine (i.e., a "Mannich base") in which the free hydroxyl groups of the Mannich base are further reacted with one or more epoxides (especially ethylene oxide, propylene oxide, or their combinations). These polyols are well known in the art of spray foams (see, e.g., U.S. Pat. No. 6,495,722). The targeted average hydroxyl functionality of the Mannich polyol is typically within the range of 3.5 to 4.5, or from 3.7 to 4.3, or from 3.9 to 4.1.

Desirable Mannich polyols will have hydroxyl numbers within the range of 300 to 550 mg KOH/g or from 400 to 500 mg KOH/g or from 425 to 470 mg KOH/g.

Suitable Mannich polyols are commercially available from Carpenter (e.g. CARPOL® MX-425, CARPOL® MX-470), Dow (e.g., VORANOL™ 425XL, VORANOL™ 470X), Huntsman (JEFFOL® R-425X, JEFFOL® R-470X), and other suppliers.

c. Aromatic Polyester Polyol

Aromatic polyester polyols are well-known reaction products of an aromatic dicarboxylic acid or anhydride (e.g., terephthalic acid, phthalic anhydride) and a diol (e.g., propylene glycol, diethylene glycol). The targeted average hydroxyl functionality of the aromatic polyester polyol is typically within the range of 1.8 to 3.0, or from 1.9 to 2.5, or from 1.9 to 2.1.

Desirable aromatic polyols will have hydroxyl numbers within the range of 230 to 400 mg KOH/g, from 250 to 350 mg KOH/g, or from 300 to 350 mg KOH/g.

Suitable aromatic polyols are commercially available from Stepan Company (STEPANPOL® PS-2520, STEPANPOL® PS-3021, STEPANPOL® 3152), Invista (TERATE® 2541, TERATE® 3510), Huntsman (TEROL® 250, TEROL® 305, TEROL® 649), Coim (ISOEXTER® TB-305, ISOEXTER® TB-306), and other suppliers.

3. Amine Catalyst

The "B" side of the polyurethane spray foam formulation includes one or more amine catalysts, which catalyze the reaction between water and the polyisocyanate to form polyureas or, in some cases, may promote trimerization of the polyisocyanate. Suitable amine catalysts are well known, and many are commercially available.

Amine catalysts are generally tertiary amines or alkanolamines and their mixtures with a diluent, typically a glycol such as dipropylene glycol. Examples include bis(2-dimethylaminoethyl)ether, N,N-dimethylaminopropylamine, N,N-dimethylethanolamine, triethylenediamine, benzyldimethylamine, N,N-dimethylcyclohexylamine, N,N,N',N',N"-pentamethyldiethylenetriamine, diethanolamine, N-ethylmorpholine, N,N,N'N'-tetramethylbutanediamine, 1,4-diaza[2.2.2]bicyclooctane, and the like, and combinations thereof. Suitable amine catalysts are available commercially from Evonik, Momentive, Huntsman, and other suppliers. Examples include POLYCAT® 5, POLYCAT® 8, POLYCAT® 30, POLYCAT® 41, DABCO® 2040 (Evonik) and NIAX® A-1 or NIAX® A-99 (Momentive).

In some aspects, the amine catalyst includes an amine/borate complex, such as adducts of TEDA and boric acid, and other amine/borate complexes such as those described in U.S. Pat. Nos. 5,086,081; 5,212,306; 5,248,646; and 5,177,046. Amine-borate complexes are marketed as a category of "low odor" amine catalysts. When used in combination with a capsaicin compound, the amine-borate complex can enhance the level of termite resistance in the spray foam (see, e.g., Table 2, Example 2, below).

The amount of amine catalyst(s) needed depends on the selection of the amine catalyst used, the nature of the other components, the NCO/OH index, the desired foam density, and other factors. Generally, the amount used is within the range of 0.1 to 5 wt. %, or from 0.5 to 4 wt. %, or from 1 to 3 wt. %, based on the amount of spray foam formulation.

4. Urethane Catalyst

The "B" side of the spray formulation also includes a catalyst that can promote the reaction of the polyol(s) and the polyisocyanate(s). Suitable urethane catalysts include carboxylates (e.g., potassium acetate, potassium octoate), organotin compounds (e.g., dibutyltin dilaurate, stannous octoate), quaternary ammonium compounds (e.g., N-(2-hydroxyethyl)trimethylammonium chloride), and the like, and combinations thereof. Suitable urethane catalysts are commercially available from Evonik (DABCO® T-12, DABCO® T-120, and KOSMOS® metal catalysts), King Industries (K-KAT® catalysts), Galata Chemicals (FOMREZ® organotin catalysts), and others.

The amount of urethane catalyst(s) needed depends on the selection of the type of urethane catalyst used, the nature of the polyol and polyisocyanate components, the NCO/OH index, and other factors. Generally, the amount used is within the range of 0.01 to 1 wt. %, or from 0.05 to 0.5 wt. %, or from 0.1 to 0.4 wt. %, based on the amount of spray foam formulation.

5. Foam-Stabilizing Surfactant

Foam-stabilizing surfactants useful for the "B" side of the polyurethane spray foam formulations are well known. Examples include products available commercially from Evonik, Dow Chemical, Siltech, Momentive Performance Materials, and others. Thus, suitable foam-stabilizing surfactants include TEGOSTAB® B silicone surfactants (Evonik), SILSTAB® silicone surfactants (Siltech), VORASURF™ surfactants (Dow), NIAX® surfactants (Momentive) and others. Many suitable foam-stabilizing surfactants are polysiloxanes or other silicon-based surfactants. In general, the surfactant should help to enable the production of a spray foam, especially a closed-cell spray foam.

The amount of foam-stabilizing surfactant needed is usually small and depends on the nature of the other components, the NCO/OH index, the desired foam density, processing particulars, and other factors. Generally, the amount used is within the range of 0.01 to 3 wt. %, or from 0.05 to 1 wt. %, or from 0.2 to 0.7 wt. %, based on the amount of spray foam formulation.

6. Blowing Agent

Blowing agents suitable for use (in addition to the water, which generates carbon dioxide when reacted with polyisocyanates) are well known and include aliphatic or cycloaliphatic $C_4$-$C_6$ hydrocarbons, mono- and polycarboxylic acids and their salts, tertiary alcohols, carbon dioxide, hydrofluorocarbons (HFCs), hydrochlorofluorocarbons (HCFCs), halogenated hydrocarbons, hydrofluoroethers (HFEs), hydrochlorofluoroolefins (HCFOs), hydrofluoroolefins (HFOs), and the like, and their mixtures. For further examples of suitable blowing agents, see U.S. Pat. No. 6,359,022, the teachings of which are incorporated herein by reference.

Preferably, the blowing agent is a compound or mixture of compounds having low global warming potential (a "low-GWP blowing agent"), low ozone-depletion potential (a "low-ODP blowing agent"), or both. Preferred blowing agents are HCFOs and HFOs, many of which meet one or more of the above criteria. Specific examples of suitable HFO and HCFO blowing agents can be found in U.S. Pat. No. 9,868,837 and WO 2019/213463, the teachings of which are incorporated herein by reference. Suitable low-GWP blowing agents, particularly HFOs, are commercially available, including OPTEON™ 1100 (1,1,1,4,4,4-hexafluoro-2-butene) and OPTEON™ 1150, products of Chemours.

The amount of blowing agent needed depends on many factors within the skilled person's discretion, including the nature of the other components, the NCO/OH index, the desired foam density and properties, and other factors. Generally, the amount used is within the range of 5 to 15 wt. %, or from 8 to 12 wt. %, based on the amount of spray foam formulation.

7. Composition Comprising a Capsaicin Compound

Unlike other polyurethane spray foam formulations, the inventive formulations include a composition comprising a capsaicin compound. The composition is commonly an oil extract of plant material, particularly peppers of the *Capsicum* genus. Oleoresin capsicum is readily available and contains multiple capsaicin compounds.

Suitable capsaicin compounds (capsaicin and "capsaicinoids") are amides. The amides have a linear or branched, saturated or unsaturated $C_8$-$C_{12}$ acyl group. The amide nitrogen is substituted with an N-(4-hydroxy-3-methoxyphenyl)methyl group. Examples include capsaicin, dihydrocapsaicin, nornordihydrocapsaicin, nornorcapsaicin, nonivamide, homodihydrocapsaicin, nordihydrocapsaicin, and homocapsaicin, which have the general structure below in which R is a linear or branched, saturated or unsaturated $C_7$-$C_{11}$ group:

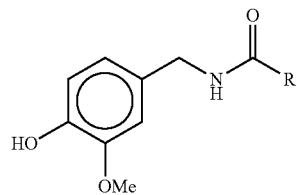

R=$C_7$-$C_{11}$ alkyl (linear or branched, saturated or unsaturated)

Specific Examples

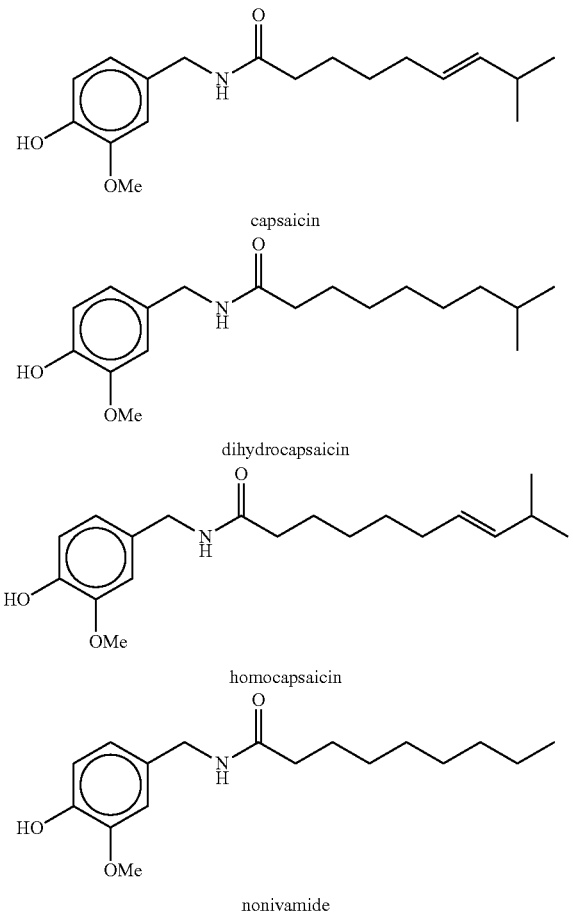

The composition comprising the capsaicin compound can be a pure capsaicin compound, a mixture of capsaicin compounds, or an oil extract or other natural product extract that contains one or more capsaicin compounds. Preferably, the composition is an oil extract that contains capsaicin.

The amount of the composition comprising the capsaicin compound needed depends on many factors within the skilled person's discretion, including the nature of the other components, the NCO/OH index, the desired foam density and properties, processing conditions, the required degree of pest resistance, and other factors. Generally, the amount used is within the range of 0.1 to 10 wt. %, from 0.5 to 5 wt. %, or from 1 to 4 wt. %, based on the amount of spray foam formulation.

In some aspects, the invention relates to a polyurethane spray foam produced using the spray foam formulations described above. Components are combined and mixed thoroughly by any convenient means, then sprayed to produce foam, typically at a job site, such as a construction site for a home or commercial/industrial building.

The spray foam can have open cells, closed cells, or some combination thereof. Preferably, the spray foam has closed cells and is used to insulate flat and uneven surfaces. In some aspects, including do-it-yourself applications, the spray foam is used to keep air and moisture from penetrating cracks, seams, and joints, especially around windows and doors.

In some aspects, the invention relates to a spray foam formulation that excludes free boric acid.

In another aspect, the invention relates to a catalyst composition. The composition comprises (a) an amine-borate complex; and (b) a composition comprising a capsaicin compound.

The following examples merely illustrate the inventive subject matter. Variations within the scope of the claims will immediately be apparent to those skilled in the art.

TEDA/Borate Preparation

An amine-borate complex is prepared from 1,4-diazabicyclo[2.2.2]octane ("TEDA") and boric acid in a 1:2 molar ratio of TEDA to boric acid, generally by the method of U.S. Pat. No. 5,086,081, Example 4.

In the spray foam formulations (Table 2), this complex is used alone (Comparative Example 3, below) or in combination with capsaicin only (Example 2), boric acid only (Comparative Example 5), or both (Comparative Example 4).

In other examples, capsaicin is used alone (Example 1) or boric acid is used alone (Comparative Example 6).

Spray Foams

Spray foams are generated using freshly made formulations having the compositions shown in Tables 1 and 2 with a commercial-scale, Graco high-pressure machine. Material is sprayed onto 24"×24" pieces of oriented strand board and processing characteristics (cream time, rise time, tack-free time) are noted. After the foams cure, samples are cut for determination of foam density and termite resistance. Foam quality is also assessed visually. See Table 2 for results.

Termite Resistance Testing

Foam samples are evaluated for termite resistance generally according to AWPA E1-17 (Laboratory Methods for Evaluating the Termite Resistance of Wood-Based Materials: Choice and No-choice Tests," American Wood Protection Association, 2017). Formosan subterranean termites (*Coptotermes formosanus*) are given no choice or a choice between Southern Pine samples and polyurethane spray foam samples. A control spray foam sample is produced without any capsaicin, amine/borate complex, or boric acid, while experimental spray foam samples are formulated as shown in Tables 1 and 2. In the choice experiments, termites choose between the control foam and the other foam samples.

The samples are evaluated on a scale of 1 to 10 as indicated below:

| Rating | Degree of termite attack | Percent of cross-sectional area affected |
|---|---|---|
| 10 | Little or none | 0 |
| 9.5 | Trace level; nibbles only | <0.5 |
| 9 | Slight | up to 3% |
| 8 | Moderate | 3-10% |
| 7 | Moderate-to-severe | 10-30% |
| 6 | Severe | 30-50% |
| 4 | Very severe | 50-75% |
| 1 | Failure | >75% |

TABLE 1

Spray Foam Formulation

| component | wt. % |
|---|---|
| ISOEXTER ® TB305 (polyester polyol, OH # 305 mg KOH/g, Coim) | 50 |
| CARPOL ® MX 425 (Mannich polyol, OH # 425 mg KOH/g, Carpenter) | 15 |
| CARPOL ® GSP 355 (glycerin-sucrose polyol, OH # 355 mg KOH/g, Carpenter) | 9.0 |
| tris(1-chloro-2-propyl)phosphate (fire retardant) | 8.0 |
| VORASURF ® DC193 (silicone surfactant, Dow) | 0.50 |
| POLYCAT ® 30 (balanced amine catalyst, Evonik) | 2.1 |
| POLYCAT ® 9 (tertiary amine catalyst, Evonik) | 0.80 |
| DABCO ® 2040 (dimethylimidazole catalyst, Evonik) | 0.50 |
| POLYCAT ® 41 (trimerization catalyst, Evonik) | 0.40 |
| DABCO ® T-120 (organotin catalyst, Evonik) | 0.25 |
| OPTEON ™ 1100 (fluorinated 2-butene blowing agent, Chemours) | 10.0 |
| water | 2.35 |
| other components (capsaicin, boric acid, amine-borate adduct (see Table 2) | 0 to 6.0 |
| LUPRANATE ® M20 (polymeric MDI, product of BASF, nominal functionality: 2.7) | 1.10 NCO/OH index |

TABLE 2

Effect of Capsaicin on Pest Control

| Other spray foam components | Control spray foam | 1 | 2 | C3 | C4 | C5 | C6 |
|---|---|---|---|---|---|---|---|
| capsaicin | 0 | 1.5 | 1.5 | 0 | 1.5 | 0 | 0 |
| amine/borate adduct[2] | 0 | 0 | 2.0 | 2.0 | 2.0 | 2.0 | 0 |
| boric acid | 0 | 0 | 0 | 0 | 2.5 | 2.5 | 2.5 |
| foam processing | | | | | | | |
| cream time, s | 3.9 | 3.7 | 4.1 | 4.0 | 8.5 | 8.0 | 12 |
| rise time, s | 15 | 18 | 15 | 15 | 34 | 31 | 33 |
| tack free, s | 8.5 | 12 | 11 | 12 | 28 | 23 | 29 |

TABLE 2-continued

Effect of Capsaicin on Pest Control

| Other spray foam components | Control spray foam | 1 | 2 | C3 | C4 | C5 | C6 |
|---|---|---|---|---|---|---|---|
| foam properties | | | | | | | |
| density, pcf | 2.0 | 1.9 | 2.0 | 2.1 | 2.5 | 2.2 | 4.1 |
| foam quality | good | good | good | good | poor | poor | poor |
| termite control by AWPA E1-17 method | | | | | | | |
| % of cross-sectional area affected | 62 | 13 | <3 | 8 | 20 | 40 | 50 |
| termite control rating[1] | 4.0 | 7.5 | 9.0 | 7.8 | 7.0 | 6.0 | 5.0 |

[1]Average of 5 samples; rating scale: 10 = best, 1 = worst. Rating for untreated pine: 1.0; >75% of cross-sectional area affected.
[2]Prepared as described in U.S. Pat. No. 5,086,081.

As shown in Table 2, spray foams produced using about 1.5 wt. % of capsaicin alone process as well as the control to give good quality foams with enhanced resistance to termite intrusion. Using capsaicin in combination with a conventional amine-borate complex further boosts termite resistance while maintaining good processing characteristics and foam quality. The amine-borate catalyst also provides spray foam with reasonably good termite resistance. Thus, the termite-inhibiting effect is substantial with capsaicin, the amine/borate complex, or a combination of capsaicin and amine/borate complex.

Although boric acid is a well-known ingredient in many pest-control formulations, particularly for cockroaches and ants, it interferes with foam processing and contributes to poor-quality foams. Consequently, any boric acid needs to be present in a complexed form, as in the amine-borate catalyst used in Comparative Example 3.

Given a choice between foam samples and untreated pine, termites (not surprisingly) prefer the pine samples to any foam sample. When the choice is between a control spray foam (0% of other components in Table 1, first column in Table 2) and the other foams (Examples 1, 2, and Comparative Examples 3-6), the termites prefer to attack the control spray foam sample.

The preceding examples are meant only as illustrations; the following claims define the scope of the invention.

I claim:

1. A pest-resistant polyurethane spray foam formulation, comprising:
   (a) an "A" side comprising one or more polyisocyanates; and
   (b) a "B" side comprising water; a polyol composition comprising one or more polyols selected from the group consisting of a glycerin-sucrose polyol, a Mannich polyol, and an aromatic polyester polyol; one or more amine catalysts; one or more urethane catalysts; one or more foam-stabilizing surfactants; a blowing agent; an amine-borate complex; and 0.1 to 10 wt. %, based on an amount of spray foam formulation, of a capsaicin compound;
   wherein a foam formed from the spray foam formulation exhibits improved termite resistance as compared to a foam formed from an otherwise identical spray foam formulation not including the capsaicin compound.

2. The spray foam formulation of claim 1 comprising 0.5 to 5 wt. % of the capsaicin compound.

3. The spray foam formulation of claim 1 wherein the capsaicin compound is selected from the group consisting of capsaicin, dihydrocapsaicin, nornorcapsaicin, nonivamide, homodihydrocapsaicin, nornordihydrocapsaicin, nordihydrocapsaicin, homocapsaicin, and any combination thereof.

4. The spray foam formulation of claim 1 wherein the one or more polyisocyanates comprise a polymeric diisocyanate.

5. The spray foam formulation of claim 1 wherein the polyol composition is a mixture comprising the glycerin-sucrose polyol, the Mannich polyol, and the aromatic polyester polyol, and where the glycerin-sucrose polyol has a hydroxyl number from 325 to 375 mg KOH/g, the Mannich polyol has a hydroxyl number from 400 to 500 mg KOH/g, and the aromatic polyester polyol has a hydroxyl number from 250 to 350 mg KOH/g.

6. The spray foam formulation of claim 1, wherein the spray foam formulation excludes free boric acid.

7. A polyurethane spray foam produced using the spray foam formulation of claim 1.

8. A closed-cell foamed polyurethane building insulation produced using the spray foam formulation of claim 1.

9. A closed-cell foamed polyurethane building insulation produced using the spray foam formulation of claim 1 and having a combination of open cells and closed cells.

10. The spray foam formulation of claim 1, wherein the amine-borate complex comprises 1,4-diazabicyclo[2.2.2]octane and boric acid.

11. The spray foam formulation of claim 1 wherein the one or more polyisocyanates comprise an aromatic polyisocyanate.

12. The spray foam formulation of claim 1 wherein the one or more amine catalysts comprise (i) a tertiary amine, an alkanolamine, or a combination thereof and (ii) a diluent.

13. The spray foam formulation of claim 1 wherein the one or more amine catalysts comprise bis(2-dimethylaminoethyl)ether, N,N-dimethylaminopropylamine, N,N-dimethylethanolamine, triethylenediamine, benzyldimethylamine, N,N-dimethylcyclohexylamine, N,N,N',N',N''-pentamethyldiethylenetriamine, diethanolamine, N-ethylmorpholine, N,N,N'N'-tetramethylbutanediamine, 1,4-diaza[2.2.2]bicyclooctane, or any combination thereof.

14. The spray foam formulation of claim 1 wherein the spray foam formulation has an NCO/OH index of 0.9 to 1.3.

* * * * *